3,178,351
VACCINE

Arthur J. Yaillen, Mequon, Wis., assignor to Fromm Laboratories, Inc., Grafton, Wis., a corporation of Wisconsin
No Drawing. Filed Sept. 5, 1961, Ser. No. 135,790
4 Claims. (Cl. 167—78)

This invention relates to an improved canine distemper virus vaccine, and to a process for preparing the vaccine.

Canine distemper virus vaccine has been prepared in the past by passing the virus of typical canine distemper serially through ferrets, the procedure involving first the inoculation of a susceptible ferret with the virus, e.g., by subcutaneous injection, then incubating for the proper time, harvesting infected tissue such as the spleen, and using a suspension of the infected tissue for inoculating another susceptible ferret. In accordance with such known process, passages of the virus through ferrets are repeated until the virus is modified to avirulence for dogs but neverthless maintains a desired degree of antigenicity for dogs. Vaccines prepared in such manner are quite effective immunologically and have enjoyed wide acceptance. However, they are not entirely satisfactory inasmuch as they sometimes produce undesirable side-effects in the vaccinated animal, which side-effects have been found to be caused by the presence in the vaccine of an appreciable proportion of the ferret spleen tissue. A further disadvantage of the above-described process is that it is inefficient in that the number of doses of vaccine obtained per sacrificed ferret used for propagating the modified virus is low.

According to the present invention, it has been found that a canine distemper vaccine which is highly effective immunologically in dogs and foxes, and in which the aforementioned undesirable side-effects have been substantially eliminated, may be efficiently prepared by inoculating ferret-modified distemper virus parenterally into susceptible ferrets, killing the inoculated ferrets at about 5–11 days post-injection, removing virus-bearing tissues, e.g., the kidneys, enzymatically digesting the virus-bearing tissues, preparing a suspension of the resulting cells in a suitable propagation medium, inoculating production bottles with such infected suspensions, and incubating the production bottles. In the preferred mode of conducting the present process virus-bearing fluids from said bottles are harvested at 3- to 5-day intervals, and fresh medium is refed to the bottles, which are then again incubated. This re-feeding and incubation storage at 3- to 5-day intervals of viral fluid may be repeated as long as cells remain attached to the glass and are viable, and any number of such separate bulk feedings which are sterile and which, on proportional recombination with re-feedings, demonstrate virulence for ferrets may be pooled for use in preparing the final vaccine.

In general, the time for harvesting infected ferret tissues for use in preparing the preesnt vaccine will be about 5 to 11 days post-injection, as pointed out above. In any specific instance the interval between inoculation of the ferret with ferret-modified distemper virus, and tissue harvest, will depend on the circumstances of that case, as known in the art. For example, at some periods during the year, such as late spring when young animals can be used, such young animals are more prone to infection and the harvest of infected tissue may be relatively early. Contrariwise, when females go into oestrus, they apparently are not as susceptible to infection, and the kidney and spleen harvest may be as late as the 10th or 11th day. The above-mentioned time of harvest of about 5 to 11 days post-injection therefore represents a range of intervals between inoculation and tissue harvest applicable in most cases, although it will be understood that the invention is not limited to tissue harvest specifically within such time period following inoculation.

An advantage of the present invention is that the virus is prepared in purer form and, consequently, the vaccine contains a greatly reduced amount of nonhomogeneous protein which is foreign to the dog or fox, when compared with commonly used vaccines of the prior art. As a result, the vaccinated dog or fox exhibits much less sensitization to the ferret tissue. A further advantage is that the virus is produced more economically by the instant process than by the above-mentioned prior art process wherein the vaccine is prepared as a suspension of ferret spleen tissue, and economy is reflected in the large number of dog doses obtained from each pair of kidneys in the present process as compared to the normal doses obtained from a spleen harvest according to the prior art. A still further advantage is that the present process may be run simultaneously with prior art processes employing other infected tissues from the same sacrificed ferret; e.g., the above-mentioned prior art method of producing spleen virus suspension may be conducted using spleens from the same animals which provide infected kidneys for use in the present process.

EXAMPLE 1

For the production of seed virus to be used for production harvests, distemper susceptible ferrets, after being held in isolation for at least 21 days, were inoculated subcutaneously with 0.5 ml. of a 0.5% ferret spleen suspension of distemperoid strain of Carré virus of not less than 50 consecutive passages through ferrets. The suspension was prepared by grinding ferret spleens from the final passage with a diluent composed of 7.5% sucrose and milk to give a 7.5% suspension of ferret spleen, and then diluting with sterile water to produce the 0.5% of suspension. The virus employed was the distemper virus demonstrated by Carré and more clearly defined by Laidlaw and Dunkin, that was subsequently modified in ferrets and has been called Green's Distemperoid virus. The method of modifying this virus is described in United States Patent No. 2,136,131 issued to Robert G. Green.

On the 7th day post-injection with the distemperoid strain of virus, all ferrets were killed and the spleens aseptically removed. Those spleens found to be free of bacterial contamination were pooled, mixed with a sufficient diluent composed of 7.5% sucrose and milk to make no less than a 7.5% suspension of spleen virus, and the mixture ground in a sterile colloid mill. The resulting suspension was vialed into bottles or ampules so as to contain adequate virus for the inoculation of the production lots, and the containers stored at temperatures at −40° C. or lower. This seed suspension was tested for bacterial sterility and injected in mice, guinea pigs, ferrets, and dogs to test for the presence of any extraneous viruses, and was demonstrated to be bacteriologically sterile. To demonstrate distemperoid virus potency, ferrets were inoculated parenterally with 0.1 mg. of spleen tissue. The ferrets died or were in extremis with typical distemper symptoms in 14 days.

EXAMPLE 2

For production harvest, susceptible ferrets were inoculated subcutaneously with 0.5 ml. of the suspension of virus spleen prepared in Example 1 diluted to 0.5% with sterile water, and the animals killed 7 days post-inoculation. The kidneys were removed aseptically and trypsinization of the cortical tissue was carried out by the method of Youngner, Proc. Soc. Exptl. Biol. and Med., vol. 85, p. 202, 1954. Growth was initiated in Roux or Povitsky bottles with Hanks basal medium containing lactalbumin hydrolysate with 5–10% sterile bovine serum and medium was renewed at 3- to 5-day intervals until full monolayers developed. The feedings following the initial feeding were made with the above medium as maintenance medium, but using 2–5% bovine serum.

The bottles were incubated at 37° C. and examined microscopically for growth. No gross cytopathogenic effect was observed. Fluid from the sterile bottles was aspirated aseptically, pooled, and frozen at −40° C. or lower, for incorporation at a later date as bulk virus. Fresh media was refed to the bottles, and the bottles returned to the incubator. The serial fluid harvests, re-feedings, and reincubation procedure were repeated at 3- to 5-day intervals eight times. The separate bulk feedings which proved to be bacteriologically sterile and which, on proportional recombination with the viral fluid produced by re-feedings, demonstrated virulence for ferrets was pooled to form bulk virus. Bulk lots of the virus fluid were mixed with sufficient diluent, composed of 7.5% sucrose, 5% pancreatic digest of casein [N-Z-Amine Type B (Sheffield Chem. Co.)], 1% gelatin [Bacto Gelatin (Difco Laboratories)] and 0.094% potassium glutamate in sterile water and adjusted to a pH of 7.1, to give a fluid containing no less than 50% of the tissue culture fluid. The bulk virus was stored in the freezer maintained at −40° C. or lower.

In the production of vaccine by this procedure, the serial fluid harvests, re-feedings, and reincubation procedure may, if desired, be repeated as little as two times, or as long as the cells remain viable and attached to the glass. If the bottles become contaminated in any of the harvesting or re-feeding procedures, the virus harvested previously can be titrated and incorporated into the vaccine.

EXAMPLE 3

The effectiveness of the vaccine produced by Example 2 was tested by restoring the freeze-dried vaccine and diluting with sterile water to produce a 10% suspension. Dogs were inoculated with the diluted vaccine and then challenged post-vaccination, along with uninoculated litter-mate controls, with a virulent strain of canine distemper virus intracardially. The results appear in the following table:

*Table I*

IMMUNIZATION OF DOGS WITH TISSUE CULTURE DISTEMPEROID VACCINE

| Experimental Lot | Field Dose Dilution | Number Vaccinated | No. dead from challenge/Total animals challenged | |
|---|---|---|---|---|
| | | | Immunized Dogs | Control Dogs |
| A | 1/10 | 3 | 0/3 | 2/3 |
| B | 1/10 | 3 | 0/3 | 2/3 |
| C | 1/10 | 3 | 0/3 | 2/3 |
| D | 1/10 | 3 | 0/3 | 2/3 |
| E | 1/10 | 3 | 0/3 | 2/3 |
| F | 1/10 | 11 | ¹ 0/9 | 3/3 |
| G | 1/10 | 10 | 0/10 | 4/5 |

¹ 2 deaths due to cardiac challenge shock.

Virus yields were determined by pooling of the various fluid harvest pools and preparing dilutions of virus. Viral dilutions were tested by subcutaneous inoculation of 1 ml. of viral dilutions. Pools of the first three feedings gave titers ranging from $10^{-2.2}$ to $10^{-4.5}$, while pools of successive feedings were in excess of $10^{-2.5}$. Reconstituted freeze-dried vaccine that had been incubated at 37° C. for 7 days was further tested for stability of the virus by reconstituting the vaccine and preparing a dilution of vaccine equivalent to one-fifth the field dose. Other vaccines were prepared as equivalents of one-tenth and one-fiftieth field dose. The results appear in the following table:

*Table II*

VACCINE STABILITY TEST—7 DAYS AT 37° C.—VIRULENCE FOR FERRET

| Experimental Lot | Field Dose Dilution | Number dead or showing symptoms/ Total animals challenged |
|---|---|---|
| A | 1/10 | 2/2 |
| B | 1/10 | 2/2 |
| C | 1/5 | 2/2 |
| D | 1/5 | 2/2 |
| F | 1/5 | 2/2 |
| G | 1/50 | 2/2 |

The restored vaccine has been demonstrated to have uniformly effective immunization qualities even when diluted beyond the normal reconstituted dose level used in the field. These tests demonstrated the efficacy of the vaccine even if subjected to abnormal environmental storage conditions, the vaccine still being able to adequately protect the dog. Stability on incubator storage has also been demonstrated.

Although the vaccine is described above in connection with its use in dogs and foxes, it is to be understood that the utility of the vaccine is not limited thereto but is effective for the immunization of other members of the family Canidae. It will also be understood that the foregoing description is merely illustrative of the invention, and that various changes in the techniques, compositions, percentages, conditions, and other factors set forth may be made without departing from the spirit of the invention as defined in the appended claims.

I claim:

1. In a process of propagating canine distemper virus including the steps of serially passing the virus through ferrets until its virulence for dogs and foxes is substantially reduced, harvesting from said ferrets attenuated-virus-bearing tissues, preparing a suspension from said tissues, and inoculating susceptible ferrets with said virus-bearing suspension, the improvement which comprises harvesting and enzymatically digesting kidney tissue from the last-mentioned infected ferrets, inoculating and incubating in vitro the so-digested kidney tissue with a growth medium, and harvesting the resulting virus-containing fluid of immunological titer and intigenicity substantially undiminished with respect to that of the live ferret serial-passage-modified canine distemper virus, but of diminished ferret tissue contamination.

2. In a process of propagating canine distemper virus including the steps of serially passing the virus through ferrets until its virulence for dogs and foxes is substantially reduced, harvesting from said ferrets attenuated-virus-bearing tissues, preparing a suspension from said tissues, and inoculating susceptible ferrets with said virus-bearing suspension, the improvement which comprises harvesting and enzymatically digesting kidney tissue from the last-mentioned infected ferrets, inoculating and incubating in vitro the so-digested kidney tissue with a growth medium, harvesting the resulting virus-containing fluid therefrom, subjecting the remaining cells to at least one refeeding, reincubating such remaining cells and maintenance medium during each of said refeedings, and harvesting from the mixture of said cells and maintenance medium after each of said refeedings additional quantities of virus-containing fluid of immunological titer and antigenicity substantially undiminished with respect to that of the live ferret serial-passage-modified canine distemper virus, but of diminished ferret tissue contamination.

3. The process of claim 2 in which the refeeding, incubating and harvesting process is serially continued until the viability of the infected kidney cells is exhausted.

4. A canine distemper vaccine produced from the product harvested after at least one of the incubation steps in the process of claim 2 dispersed in a parenterally acceptable sterile liquid carrier and having immunizing activity for dogs and foxes, but retaining its virulence for ferrets.

References Cited in the file of this patent

UNITED STATES PATENTS

| | | |
|---|---|---|
| 2,720,484 | Meadows et al. | Oct. 11, 1955 |
| 2,912,361 | Froelich | Nov. 10, 1959 |
| 2,965,544 | Cabasso | Dec. 20, 1960 |

OTHER REFERENCES

Vantsis: "Preliminary Note on the Propagation of Canine Distemper Virus in Different Tissue-Culture Systems," Veterinary Record, vol. 71, No. 5, pp. 99–100, January 31, 1959.

Rockborn: "An Attenuated Strain of Canine Distemper Virus in Tissue Culture," Nature, vol. 184, p. 822, September 12, 1959.

Cabasso: "Contributions of Tissue Culture to Canine Hepatitis and Distemper Vaccination," Journal A.V.M.A., vol. 136, No. 1, January 1, pp. 1–8, 1960.

Prier: "Live Virus Immunizating Agents, " J. Am. Vet. Med. Assn., vol. 137, No. 10, November 15, 1960, pp. 577–584.